United States Patent [19]

Welty, Jr.

[11] 4,086,324
[45] Apr. 25, 1978

[54] REMOVAL OF SULFUR AND NITROGEN OXIDES WITH AQUEOUS ABSORBENT

[76] Inventor: Albert B. Welty, Jr., 225 Watchung Fork, Westfield, N.J. 07090

[21] Appl. No.: 432,434

[22] Filed: Jan. 11, 1974

Related U.S. Application Data

[63] Continuation-in-part of Ser. No. 291,385, Sep. 22, 1972, abandoned.

[51] Int. Cl.² .................... C01B 21/00; C01B 17/00
[52] U.S. Cl. .................................. 423/235; 423/242
[58] Field of Search ............. 423/222, 235, 242, 514, 423/519, 520

[56] References Cited

U.S. PATENT DOCUMENTS

| | | | |
|---|---|---|---|
| 1,795,121 | 3/1931 | Hansen | 423/222 |
| 2,405,747 | 8/1946 | Hixson et al. | 423/242 |
| 3,635,820 | 1/1972 | Urban | 423/514 |
| 3,644,087 | 2/1972 | Urban | 423/242 |
| 3,645,671 | 2/1972 | Griffin, Jr. et al. | 423/242 |
| 3,676,059 | 7/1972 | Welty, Jr. | 423/242 |
| 3,695,829 | 10/1972 | Griffin, Jr. et al. | 423/242 |
| 3,728,433 | 4/1973 | Urban | 423/242 |

FOREIGN PATENT DOCUMENTS

545,627  2/1932  Germany .................. 423/573 L

Primary Examiner—O. R. Vertiz
Assistant Examiner—Gary P. Straub

[57] ABSTRACT

Sulfur oxides and nitrogen oxides are removed from flue gas by scrubbing the flue gas with an aqueous ammoniacal solution containing ammonium thiosulfate and either ammonium sulfite or ammonium hydroxide. The presence of ammonium thiosulfate in the absorbent solution also inhibits the oxidation of sulfur dioxide to hexavalent sulfur. The scrubber effluent solution or a portion thereof is acidified in order to liberate sulfur dioxide in a concentrated stream.

4 Claims, 2 Drawing Figures

FIGURE I

REMOVAL OF SULFUR AND NITROGEN OXIDES WITH AQUEOUS ABSORBENT

This application is a continuation-in-part of copending application Ser. No. 291,385 filed Sept. 22, 1972 and now abandoned.

BACKGROUND OF THE INVENTION

This invention relates to processes for removing atmospheric pollutants, more particularly sulfur oxides and nitrogen oxides, from waste gases such as flue gas.

The combustion of a sulfur-containing fossil fuel (e.g., coal or oil) with air yields flue gas containing both sulfur oxides and nitrogen oxides. Quantities depend on the fuel sulfur content and on combustion conditions; typical quantities are about 0.1–0.5% (more usually 0.2–0.3%) by volume of $SO_2$, trace amounts of $SO_3$, and about 300–1500 ppm by volume of nitrogen oxides ($NO_x$) of which about 85–90% is NO, the rest $NO_2$. A typical flue gas stream also contains some free oxygen (usually about 1 to about 8% by volume) due to the use of excess air; small amounts of fly ash, balance mostly carbon dioxide, water vapor and nitrogen.

Sulfur dioxide has long been recognized as an atmospheric pollutant, and a number of processes for its removal from gases have been proposed. These processes generally will also remove sulfur trioxide when present. More recently, nitrogen oxides have also been recognized as an atmospheric pollutant.

Wet processes for removing sulfur dioxide from flue gas and other waste gases are well known. Such processes have been described for example in U.S. Pat. Nos. 2,134,481 and 2,405,747; in U.S. Pat. Nos. 3,645,671 to Lindsay I. Griffin and myself, and in my U.S. Pat. No. 3,676,059. In the processes described in these patents, an aqueous ammoniacal absorbent solution containing either ammonium hydroxide (U.S. Pat. No. 2,405,747) or ammonium sulfite (the other patents) is used to remove sulfur oxides, and a gas stream containing sulfur dioxide in greater concentration that the original flue gas stream is obtained on regeneration of the scrubber effluent solution. The by-product sulfur dioxide can be converted by known means either to sulfur (e.g., by the Claus process) or to sulfuric acid. Alternatively, the scrubber effluent can be treated with air to form ammonium sulfate as described in U.S. Pat. No. 2,810,627.

Most processes for removing nitrogen oxides from gases are dry processes. Wet processes for nitrogen oxide removal are relatively few in number. It is known, however, that aqueous caustic is an efficient absorbent for removing NO and $NO_2$ from gases when NO and $NO_2$ are present in equimolar amounts, but much less efficient when NO is present in large excess; see H. R. L. Streight, *Canadian Journal of Chemical Engineering*, Volume 36, pages 3–11, Feb. 1958. U.S. Pat. No. 3,654,103 describes removal of sulfur oxides and nitrogen oxides by scrubbing with an aqueous alkaline solution containing sodium or ammonium thiosulfate or a sodium or ammonium polythionate, with electrolytic regeneration of the absorbent solution.

SUMMARY OF THE INVENTION

According to the present invention, sulfur oxides and nitrogen oxides are removed from waste gases such as flue gas by scrubbing with an aqueous ammoniacal absorbent solution having a pH of at least about 6 and containing ammonium thiosulfate; the scrubber effluent solution or a portion thereof is acidified with ammonium bisulfate with the liberation of a concentrated sulfur dioxide stream, with the formation of ammonium sulfate, and with the formation of elemental sulfur when excess ammonium thiosulfate is used; the ammonium sulfate formed on acidification is thermally decomposed into ammonium bisulfate and ammonia, and concurrently any elemental sulfur present is oxidized to sulfur dioxide; the ammonia and any sulfur dioxide thus formed are used in the preparation of fresh absorbent solution.

The preferred aqueous ammoniacal absorbent solution contains ammonium sulfite and ammonium thiosulfate and has a pH of about 6 to about 7.

THE DRAWINGS

DESCRIPTION OF THE PREFERRED EMBODIMENT

Figure 1:
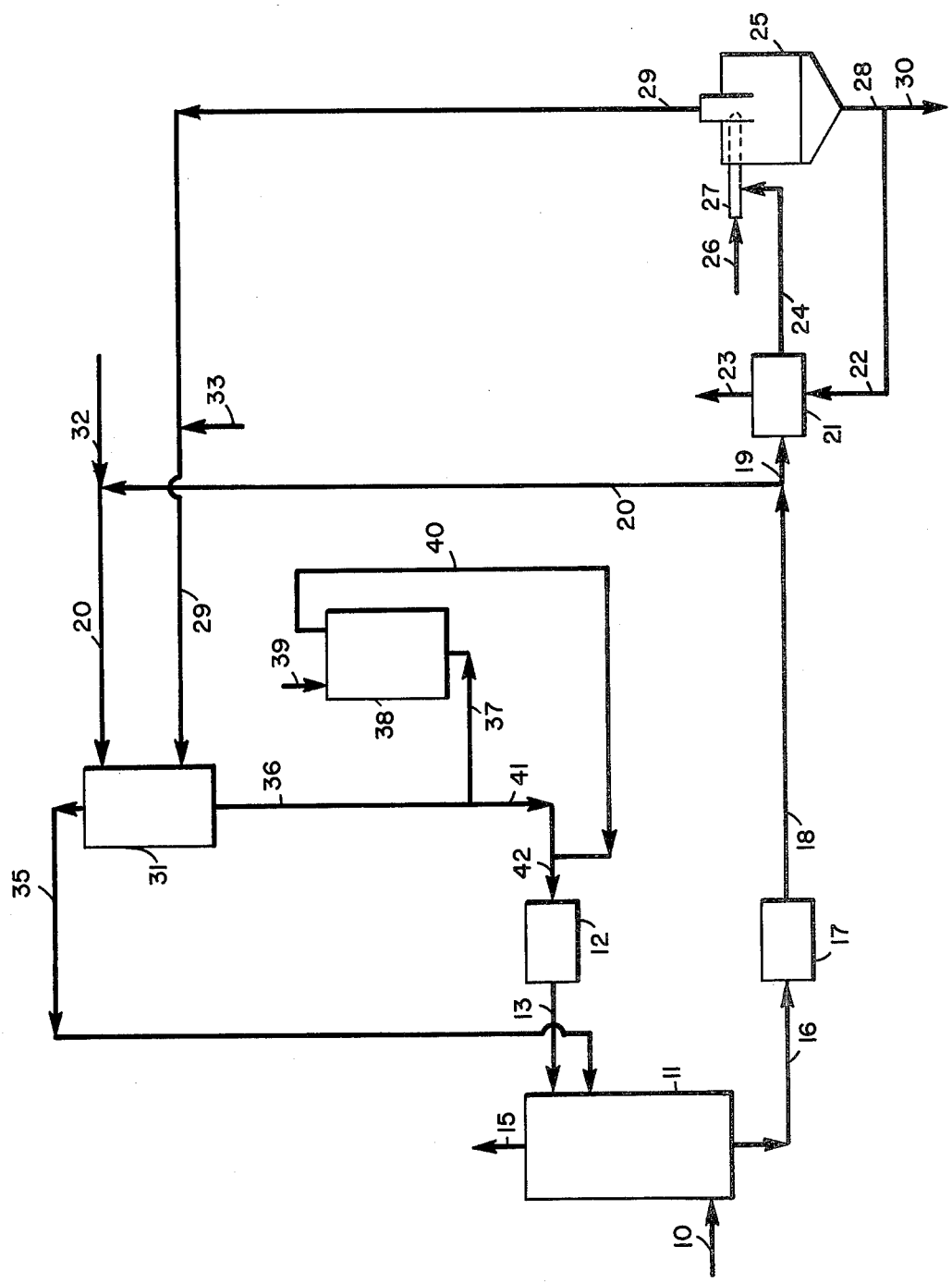
FIG. 1 is a flow sheet showing a preferred embodiment of this invention.

This process is generally applicable to the treatment of waste gas streams containing sulfur oxides and nitrogen oxides as impurities. This process is especially useful in the treatment of flue gas formed by combustion of a sulfur-containing fossil fuel, e.g., coal or oil, in air. A typical flue gas analysis has been given earlier in the specification. As will be noted, flue gas typically contains oxygen as well as sulfur oxides and nitrogen oxides.

Sulfur oxides and nitrogen oxides are removed from flue gas or other waste gas containing the same according to this invention by contacting a waste gas stream in a scrubber (or scrubbing zone) with an aqueous ammoniacal absorbent solution have a pH of at least about 6 and containing ammonium thiosulfate. It should be understood throughout this invention that, when reference is made to ammonium thiosulfate, i.e. $(NH_4)_2S_2O_3$, ammonium salts of other poly-sulfur acids may also be present. These ammonium salts of other poly-sulfur acids react similarly to thiosulfate. For convenience the ammonium thiosulfate plus the ammonium salts of other poly-sulfur acids are referred to simply as thiosulfate. A preferred absorbent solution is one having a pH of about 6 to about 7 and containing ammonium sulfite as the principal solute component, with ammonium bisulfite and ammonium thiosulfate also present.

In this regard, it should be noted that essentially any concentration of ammonium sulfite in the absorbent solution would be effective to separate at least some $SO_2$ from the flue gas. The method of this invention is, however, most effective when the concentration of ammonium sulfite in solution and the total amount of solution actually used is sufficient to separate at least ninety percent (90%) of the $SO_2$ and $SO_3$ initially contained in the flue gas. Generally, then, this will be accomplished when the molar flow rate of ammonium sulfite in the influent scrubbing solution, AS, is at least as great as the value determined from the following equation:

$$AS = 0.9A + 2B + 0.006 Z + c(1.8A + 2B + 2.0y + 0.024Z + D)$$

where $A$ = molar flow rate of $SO_2$ in the influent flue gas stream;

$B$ = molar flow rate of $SO_3$ in the influent flue gas stream;

$c$ = is the molar ratio of ammonium sulfite to ammonium bisulfite desired in the effluent stream, generally between about 0.15 and 1.0;

$D$ = molar flow rate of ammonium bisulfite in the influent scrubber solution;

$Z$ = molar flow rate of oxygen in the influent flue gas stream; and $y$ = $O_2$ equivalent to molar flow rate of $NO_x$ in the influent flue gas stream.

It will, of course, be appreciated that higher molar flow rates of ammonium sulfite could be used, and that an increased separation capacity would be achieved therewith. One-hundred percent separation would not, however, normally be achieved.

It should also be noted that, generally, any concentration of ammonium thiosulfate would be effective to reduce the amount of ammonium sulfate that would otherwise be formed during the absorption step of the present process. Best results, however, will be achieved when the total amount of ammonium thiosulfate actually used is sufficient, on the one hand, to effect the desired reduction in the amount of $NO_x$ in the flue gas and in the amount of sulfite oxidized to sulfate, while, on the other hand, it is limited to the amount actually needed in order to minimize the amount of ammonium thiosulfate carried with the effluent scrubber solution to the regeneration system. Ammonium thiosulfate in the effluent solution produces sulfur in the acidifier of the regeneration system and this in turn leads to the formation of $SO_2$ in the ammonium sulfate decomposer, which is described more fully below. The net result is the oxidation of sulfur to $SO_2$, which is generally undesirable. Hence, the need to limit the amount of ammonium thiosulfate used. On the other hand, it is necessary to have some excess of ammonium thiosulfate in the scrubber effluent solution in order to provide a sufficient driving force for $NO_x$ removal and for inhibiting ammonium sulfite oxidation in the bottom portion of the scrubber where the flue gas enters. Best results are, then, obtained when the molar flow rate of ammonium thiosulfate in the influent scrubbing solution, NT, is within the range determined by the following equation:

$NT = X(y + 0.012Z)$ where $X$ = a constant reflecting the desired excess of ammonium thiosulfate, generally between about 1.1 and 2.0; and $y$ and $Z$ are as previously defined. Generally, the weight ratio of ammonium thiosulfate to ammonium sulfite will range between about 0.10 to about 0.70.

It will, of course, be appreciated that other components, such as ammonium bisulfite and ammonium sulfate, may be present in influent scrubbing solution. This will, however, generally result from incomplete regeneration and is neither essential nor detrimental to the present invention.

Sulfur dioxide and sulfur trioxide are then absorbed from the flue gas by reaction with ammonium sulfite; while a small portion of the ammonium sulfite or bisulfite in solution (usually no more than about 10%) is oxidized by oxygen in the flue gas to hexavalent sulfur, e.g., ammonium sulfate. The nitrogen oxides in the flue gas are reduced to nitrogen by ammonium thiosulfate. Ammonium thiosulfate also reacts with oxygen; this reaction suppresses the oxidation of tetravalent sulfur to the hexavalent state.

The principal reactions taking place in the scrubber are as follows:

$SO_2 + (NH_4)_2SO_3 + H_2O \rightarrow 2\, NH_4HSO_3$ (1)

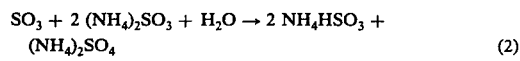

$SO_3 + 2\,(NH_4)_2SO_3 + H_2O \rightarrow 2\, NH_4HSO_3 + (NH_4)_2SO_4$ (2)

$\tfrac{1}{2} O_2 + (NH_4)_2SO_3 \rightarrow (NH_4)_2SO_4$ (3)

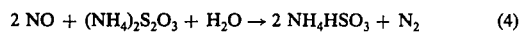

$2\, NO + (NH_4)_2S_2O_3 + H_2O \rightarrow 2\, NH_4HSO_3 + N_2$ (4)

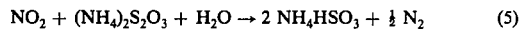

$NO_2 + (NH_4)_2S_2O_3 + H_2O \rightarrow 2\, NH_4HSO_3 + \tfrac{1}{2} N_2$ (5)

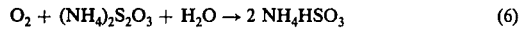

$O_2 + (NH_4)_2S_2O_3 + H_2O \rightarrow 2\, NH_4HSO_3$ (6)

The scrubber may be operated under temperature and pressure conditions known in the art. Preferred temperatures range from about 95° F. to about 140° F. The pressure is that at which the gas to be scrubbed is available. In the case of flue gas this is usually substantially atmospheric pressure, e.g., about 1 to 2 psig. However, where the gas to be scrubbed is available at an elevated pressure of several atmospheres or more, scrubbing can be advantageously conducted at such elevated pressure.

About 90% of the incoming sulfur oxides and about 90% of the incoming nitrogen oxides are typically removed from the incoming gas stream according to this invention.

At least a portion of the scrubber effluent solution is acidified with ammonium bisulfate. The scrubber effluent solution contains ammonium bisulfite (normally the principal solute component), ammonium sulfite, ammonium sulfate (due to oxidation of a small amount of tetravalent sulfur in the scrubber to the hexavalent state and to $SO_3$ present in the influent flue gas), and, in a preferred embodiment, ammonium thiosulfate due to the use of excess ammonium thiosulfate in the absorbent solution. A sulfur dioxide gas stream which is more concentrated in $SO_2$ than the incoming flue gas is liberated, and ammonium sulfate is produced as a by-product. Any ammonium thiosulfate present in the scrubber effluent solution is decomposed in the acidifier (or acidification zone) with the formation of elemental sulfur as well as additional quantities of sulfur dioxide and ammonium sulfate. The quantity of sulfur dioxide liberated is equal to the quantity of sulfur dioxide absorbed in the tetravalent state (as ammonium bisulfite) in the scrubber plus a quantity equivalent to the quantity of nitrogen oxides reduced in the scrubber. The equations for the principal reactions taking place in the acidifier are as follows:

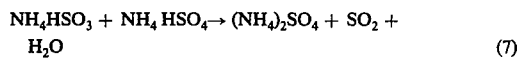

$NH_4HSO_3 + NH_4HSO_4 \rightarrow (NH_4)_2SO_4 + SO_2 + H_2O$ (7)

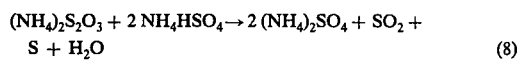

$(NH_4)_2S_2O_3 + 2\, NH_4HSO_4 \rightarrow 2\,(NH_4)_2SO_4 + SO_2 + S + H_2O$ (8)

The ammonium sulfate formed in the acidification zone, together with ammonium bisulfate and any elemental sulfur which is formed, is transferred as an aqueous solution or slurry to a decomposer (or decomposition zone). The ammonium sulfate, or at least the major portion of it, is decomposed in the decomposition zone into ammonium bisulfate and ammonia. This can be accomplished at temperatures of approximately 600°–750° F., as is known in the art (see U.S. Pat. No. 3,645,671), using a suitable heat source such as hot combustion gas. Alternatively, slightly higher temperatures can be used so that a part of the ammonium sulfate is decomposed into nitrogen and sulfur dioxide rather than into ammonium bisulfate (see U.S. Pat. No. 3,676,059, for example); build-up of hexavalent sulfur in the system can be prevented in this manner if desired. Simultaneously, any elemental sulfur present in the ammonium sulfate-bisulfate solution or slurry is oxidized to sulfur dioxide. The principal reactions taking place in the decomposition zone are as follows:

$$(NH_4)_2SO_4 \rightarrow NH_4HSO_4 + NH_3 \quad (9)$$

$$2\ NH_4HSO_4 + S \rightarrow 3\ SO_2 + 2\ NH_3 + 2\ H_2O \quad (10)$$

Ammonia and sulfur dioxide which are given off in the decomposition zone are reacted with either ammonium bisulfite, or sulfur dioxide, or any mixture of these, plus either hydrogen sulfide or elemental sulfur, in an aqueous medium in order to prepare fresh absorbent solution containing ammonium sulfite and ammonium thiosulfate in the desired proportions. The portion of scrubber effluent solution which is not acidified constitutes a convenient source of ammonium bisulfite for this reaction. The principal equations are as follows:

$$NH_4HSO_3 + NH_3 \rightarrow (NH_4)_2SO_3 \quad (11)$$

$$(NH_4)_2SO_3 + S \rightarrow (NH_4)_2S_2O_3 \quad (12)$$

$$2\ (NH_4)_2SO_3 + 2\ NH_4HSO_3 + 2\ H_2S \rightarrow 3\ (NH_4)_2S_2O_3 + 3\ H_2O \quad (13)$$

This invention will now be described in further detail with respect to a preferred embodiment thereof, as shown in FIG. 1 of the drawing.

Referring to FIG. 1, a flue gas stream containing sulfur oxides and nitrogen oxides is introduced into the bottom of scrubber 11, where it is countercurrently contacted with an aqueous ammoniacal solution which is introduced into the top of scrubber 11 from holding tank 12 through solution inlet line 13. This ammoniacal absorbent solution contains ammonium sulfite, ammonium bisulfite, and a smaller quantity of ammonium thiosulfate, and has a pH of about 6 to about 7. An excess of ammonium thiosulfate is preferably present in the absorbent solution in order to maximize removal of nitrogen oxides and to minimize oxidation of tetravalent sulfur to the hexavalent state. A small quantity of ammonium sulfate may also be present. The scrubber 11 is preferably a vertical packed tower. The solution rate is substantially proportional to the rate of flow of sulfur dioxide in the flue gas.

Treated flue gas of reduced sulfur oxide and nitrogen oxide content is discharged from the scrubber by overhead line 15. Typically about 90% of the sulfur oxides and about 90% of the nitrogen oxides in the incoming flue gas are removed in scrubber 11. The stack gas in line 15 may contain small amounts of ammonia; this can be removed by scrubbing with water if desired. Aqueous scrubber effluent solution is removed from the bottom of the scrubber 11 via line 16 and is sent to holding tank 17. The scrubber effluent solution contains ammonium bisulfite (usually the principal solute component), ammonium sulfite, ammonium sulfate, and usually a small amount of ammonium thiosulfate due to the use of excess ammonium thiosulfate in the absorbent solution. A portion of the effluent solution 18 may be recirculated in scrubber 11.

The solution flow rate in scrubber 11 is varied in accordance with changes in the flue gas rate and the sulfur oxide content of gas stream 10. Considerable fluctuation in flue gas flow rates can occur during the course of a day in electric power plants, due to fluctuations in power demand. By the use of holding tanks 12 and 17, it is possible to run the entire regeneration section (the portion to the right of tanks 12 and 17 in FIG. 1) of the system at a substantially constant flow rate.

Scrubber effluent solution is withdrawn from holding tank 17 through line 18 at a substantially constant flow rate, and this stream is divided into two portions. The first and smaller portion, which is stream 19, is treated to liberate sulfur dioxide. The second and larger portion, stream 20, is used to prepare fresh absorbent solution as will be hereinafter described.

The scrubber effluent solution stream 19 is introduced into acidifier 21, where it is reacted with excess ammonium bisulfate introduced in the molten state through recycle line 22. The sensible heat of the molten ammonium bisulfate stream and the heat of reaction are such that the acidifier is maintained at its desired operating temperature of about 200°–225° F. A concentrated sulfur dioxide stream, which is a mixture of sulfur dioxide and water vapor, is liberated in acidifier 21 and withdrawn through overhead line 23. The water vapor may be separated from the sulfur dioxide by known means and the sulfur dioxide converted to either sulfur or sulfuric acid. Ammonium sulfate and elemental sulfur are also formed in acidifier 21.

An aqueous slurry of ammonium sulfate, ammonium bisulfate, and elemental sulfur, is withdrawn from the acidifier 21 through line 24, and is introduced into a decomposer 25. The ammonium bisulfate is largely in solution and the elemental sulfur is in suspension; ammonium sulfate in a preferred mode of operating is partly in solution and partly in suspension, but may be entirely in solution depending on the ammonium salt concentrations in the absorbent solution in line 13. A preferred mode of heating decomposer 25 is by direct contact with hot combustion gases. In the embodiment shown in FIG. 1, a mixture of fuel and air is introduced through line 26 into a refractory lined combustion tube 27 where the fuel is burned. The ammonium sulfate-ammonium bisulfate-sulfur slurry in line 24 is introduced into the hot combustion gas stream in combustion tube 27. The water in the slurry is evaporated, the ammonium sulfate is decomposed into ammonium bisulfate and ammonia, and the sulfur is oxidized to sulfur dioxide. The major proportion of ammonium sulfate is decomposed into ammonium bisulfate and ammonia. (A small amount of ammonium sulfate, usually not more than about 15%, may pass through the decomposer 25 undecomposed.) Molten ammonium bisulfate product (which may contain a small amount of undecomposed ammonium sulfate) is collected in a pool at the bottom of decomposer 25, and is withdrawn from the decomposer 25 through outlet line 28. A gaseous mixture of ammonia, sulfur dioxide and water vapor, and combustion gas, is removed from the decomposer 25 through overhead line 29.

All or at least a major portion of the ammonium bisulfate products in line 28 is returned to the acidifier 21 via recycle line 22. A minor portion of the ammonium bisulfate product may be withdrawn from the system through line 30 if necessary to prevent hexavalent sulfur build-up in the system. However, it is preferred to operate the system in such a way that the amount of hexavalent sulfur entering the absorbent solution in scrubber 11 (mostly by oxidation of $SO_2$ in scrubber 11, a small amount by absorption of $SO_3$) is balanced by the quantity of ammonium sulfate reduced by sulfur to sulfur dioxide in decomposer 25.

The second (and larger) portion of scrubber effluent solution is conveyed via line 20 to ammoniator tower 31, which is a vertical packed absorption tower. The gaseous mixture in decomposer overhead line 29 is also conveyed to the ammoniator tower 31, where it is countercurrently contacted with the absorber effluent solution entering through line 20. Makeup water and makeup ammonia are added through lines 32 and 33 respectively, to solution line 20 and gas line 29, respectively, as required. The quantity of makeup ammonia required is equal to the ammonia stack losses in line 15 plus the quantity of ammonium bisulfate (if any) discharged through line 30 plus any ammonia decomposed to nitrogen in reducing disulfate to $SO_2$ in decomposer 25. Gases which are not absorbed in tower 31 (e.g., combustion gas and water vapor) are removed from the tower 31 through overhead line 35. These gases are returned to the scrubber 11 in order to remove any ammonia or sulfur dioxide which may be present.

An aqueous solution which is primarily ammonium sulfite is removed from the bottom of the ammoniator tower 31 through line 36. A portion of this solution may be recirculated to the top of the tower 31 through a recirculation line not shown. A portion of the solution in line 36 is diverted through line 37 to sulfurator 38. Elemental sulfur is introduced into sulfurator 38 via line 39, and is reacted in the sulfurator with the ammonium sulfite from solution line 37 to form ammonium thiosulfate. The sulfurator 38 is preferably maintained at a temperature of about 100° F to about 150° F and a pressure of about atmospheric to about 5 psig., although any desired pressure can be used satisfactorily. A mixed ammonium sulfite-ammonium thiosulfate solution containing small amounts of ammonium sulfate is withdrawn from sulfurator through line 40. This solution is mixed with additional quantities of ammoniator effluent solution from line 36 and bypass line 41. The resulting solution, which has the composition desired in the fresh absorbent solution, flows through line 42 into holding tank 12. Fresh absorbent solution is withdrawn from holding tank 12 to treat further quantities of flue gas in scrubber 11, as already described.

Modifications can be made without departing from the spirit of this invention. For example, there are basically three ways in which sulfate build-up in the system can be prevented. The first and preferred way, which has already been explained with reference to FIG. 1, is to reduce by reaction with elemental sulfur in decomposer 25 a quantity of ammonium sulfate and/or bisulfate which is equivalent to the quantity of hexavalent sulfur entering the scrubbing solution in scrubber 11. The second way is to operate the decomposer 25 at temperatures higher than those earlier indicated (i.e. above about 750° F.), so that a part of the entering ammonium sulfate and/or ammonium bisulfate is decomposed into sulfur dioxide, nitrogen, ammonia and water vapor as described in my U.S. Pat. No. 3,676,059. The third and probably least desirable way is to remove ammonium bisulfate from the system through line 30; this is the least desirable way in most cases because ammonium sulfate and ammonium bisulfate are generally in oversupply. Any combination of these three modes of preventing sulfate build-up can be used.

A second modification which can be made is to use aqueous ammonia (or ammonium hydroxide) containing ammonium thiosulfate instead of aqueous ammonium sulfite or ammonium sulfite-ammonium bisulfite containing ammonium thiosulfate as the absorbent solution. In this case, the necessary ammonium thiosulfate is made by bringing together the necessary $NH_3$, $SO_2$, $H_2O$ and sulfur in sulfurator 38; all or most of the absorber effluent solution in line 18 will be acidified in acidifier 21; the quantity of sulfur (principally as ammonium bisulfite) in line 20 will be equivalent to the quantity of ammonium thiosulfate made in sulfurator 38.

In another modification, which will now be described with reference to FIG. 2, hydrogen sulfide is used instead of elemental sulfur in preparing fresh ammonium thiosulfate, and the ammoniation and sulfuration of scrubber effluent solution in order to make fresh absorbent solution are combined into a single operation.

Figure 2:
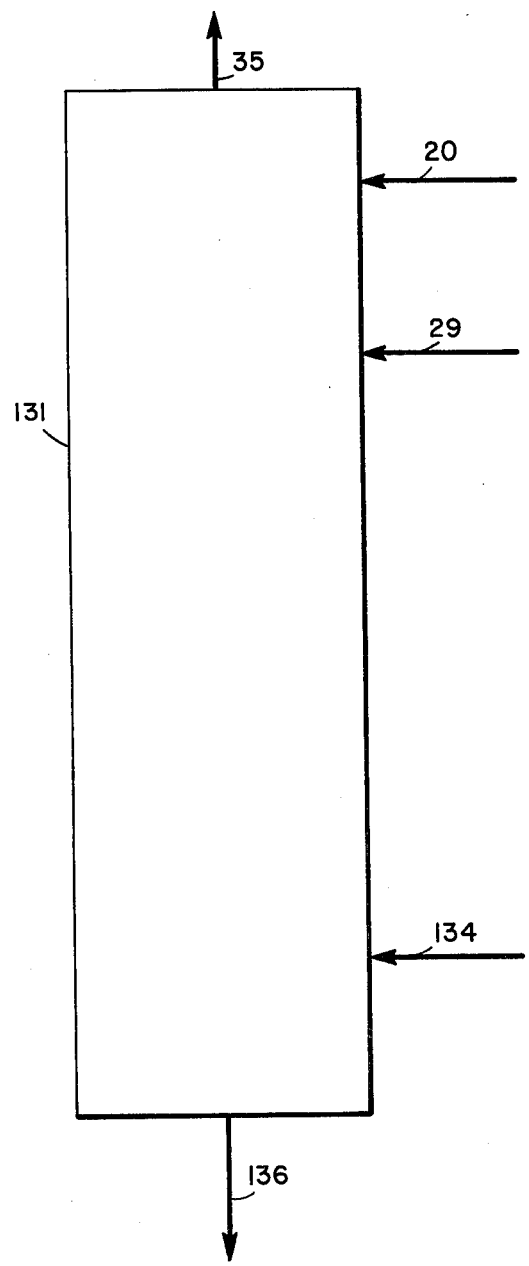
FIG. 2 is a partial flow sheet showing a modification of the process of FIG. 1.

Referring to FIG. 2, scrubber effluent solution (principally ammonium bisulfite as already explained) in line 20 is introduced into the top of packed tower 131, which is a combined ammoniator and sulfurator. The gaseous mixture in line 29 (principally combustion gas, water vapor, and ammonia, with small quantities of sulfur dioxide) is introduced into the mid section of tower 131. The gas stream from line 29 countercurrently contacts the solution from line 20 in the upper portion of tower 131, resulting in the reaction of ammonium bisulfite and ammonia to form ammonium sulfite. Hydrogen sulfide is introduced into the lower portion of tower 131 via line 134, and countercurrently contacts the descending solution in the tower. A portion of the ammonium sulfite and ammonium bisulfite present are converted to ammonium thiosulfate. Non-absorbed gases are withdrawn from tower 131 through overhead line 35. Ammonium sulfite-ammonium bisulfite solution having the desired composition and pH of fresh absorbent solution is withdrawn from the bottom of tower 131 through line 136. A portion of the solution in line 136 may be recirculated to the top of the tower 131 through a recirculation line not shown. The portion which is not recirculated is sent to holding tank 12. The remainder of the system according to the embodiment of FIG. 2 is the same as in FIG. 1.

As has been seen from the foregoing description, the present invention provides a wet process which removes nitrogen oxides as well as sulfur oxides from flue gas and other waste gases. This invention also makes it possible to prevent sulfate build-up in this system by use of sulfur or hydrogen sulfide instead of consuming ammonia in order to convert unwanted sulfate into sulfur dioxide.

Auxiliary equipment such as pumps, pressure reducing devices, heat exchangers, and solution recirculation lines have been omitted.

This invention will now be described further with reference to the examples which follow:

EXAMPLE 1

Referring to FIG. 1, flue gas containing about 0.18% by volume of $SO_2$, about 9 ppm of $SO_3$, and about 460 ppm of nitrogen oxides (approximately 90% NO and 10% $NO_2$) flows through line 10 into the bottom of scrubber 11 at an average flow rate of about 229,000 pound moles per hour and at an inlet temperature of 130° F. The flue gas stream is countercurrently contacted with an aqueous ammoniacal absorbent solution introduced into the scrubber 11 through line 13. This aqueous solution contains ammonium sulfite, ammonium bisulfite, ammonium thiosulfate, and ammonium sulfate, and has a pH of about 6.6. The molar flow rates of ammonium thiosulfate and ammonium sulfite, as determined from the preceding equations, were 142 and 924, respectively. The temperature at the top of scrubber 11 is about 130° F. and the temperature at the bottom of scrubber 11 is about 130° F. The pressure in scrubber 11 is substantially atmospheric. A flue gas stream of reduced sulfur oxide and nitrogen oxide content, containing about 230 ppm of $SO_2$ and about 50 ppm of NO is discharged via line 15. The scrubber effluent solution containing ammonium bisulfite, ammonium sulfite, ammonium sulfate and ammonium thiosulfate and having a pH of about 5.6 leaves scrubber 11 via line 16 at about 130° F. and is conveyed to holding tank 17.

Scrubber effluent solution is withdrawn from holding tank 17 via line 18 and is divided into two streams 19 and 20. Stream 19, the smaller stream, flows into acidifier 21, which is maintained at a temperature of about 200°–225° F. and at about atmospheric pressure. Molten ammonium bisulfate in excess is introduced into acidifier 21 via line 22. Sulfur dioxide and water vapor are removed overhead via line 23.

An aqueous slurry of ammonium sulfate, ammonium bisulfate, and small amounts of elemental sulfur pass from acidifier 21 through line 24 to decomposer 25. The slurry is introduced into a hot combustion gas stream entering through line 26. Molten ammonium bisulfate (which may contain a small amount of undecomposed ammonium sulfate) is removed from the decomposer 25 through line 28 and is recycled to acidifier 21 via line 22. Ammonia and a small amount of sulfur dioxide formed in decomposer 25 are entrained in the combustion gas stream and leave the decomposer through overhead line 29.

The second portion of scrubber effluent solution in line 20, and the gaseous stream 29, are countercurrently contacted in ammoniator 31, forming ammonium sulfite solution. Makeup water and makeup ammonia may be added via lines 32 and 33, respectively, as required; only ammonia is required in the preferred embodiment described in this example. A portion of the ammoniator effluent solution from line 36 is reacted with sulfur in sulfurator 38; the resulting ammonium sulfite-ammonium thiosulfate solution in line 40 is mixed with additional ammoniator effluent solution from line 41 to form fresh absorbent solution, which is conveyed through line 42 to holding tank 12.

Stream quantities in pound moles per hour (except in streams 22 and 24) are shown in Table I below. In this table, reference numerals refer to FIG. 1 of the drawing. The quantities are typical of those which would be encountered in an 800 megawatt power plant. Quantities of streams entering and leaving scrubber 11 (other than stream 35) are average values, since there is considerable fluctuation in flue gas generation rates at an electric power plant during a 24-hour period; all other stream quantities are essentially steady state values. The quantities are denoted in terms of constituents; thus, one mole of ammonium sulfite, $(NH_4)_2SO_3$, is denoted as two moles of $NH_3$ and one mole of $SO_2$; and one mole of ammonium thiosulfate, $(NH_4)_2S_2O_3$, is denoted as two moles of $NH_3$, one mole of $SO_2$ and one mole of S. In addition to constituents shown there are 5000 pound mols per hour of $O_2$ in the influent flue gas (stream 10).

TABLE I

| Reference Numeral | Constituent | | | | | | |
|---|---|---|---|---|---|---|---|
| | $SO_2$ | $SO_3$ | NO | $NO_2$ | $NH_3$ | S | $H_2O$ |
| 10 | 419 | 2 | 96 | 10 | — | — | (1) |
| 13 | 1071 | 36 | — | — | 2181 | 142 | 13,300 |
| 15 | 54 | — | 12 | — | 70 | — | (1) |
| 16 | 1534 | 53 | — | — | 2111 | 29 | 13,300 |
| 19 | 489 | 17 | — | — | 673 | 9 | 4,240 |
| 20 | 1045 | 36 | — | — | 1438 | 20 | 9,060 |
| 23 | 489 | — | — | — | — | — | 1,240 |
| 26 | — | — | 2 | — | — | — | — |
| 29 | 26 | — | 2 | — | 673 | — | 3,000(2) |
| 33 | — | — | — | — | 170 | — | — |
| 35 | — | — | 2 | — | — | — | (1) |
| 36 | 1045 | 36 | — | — | 2181 | 20 | 13,300 |
| 37 | 523 | 18 | — | — | 1091 | 10 | 6,650 |
| 39 | — | — | — | — | — | 122 | — |
| 40 | 523 | 18 | — | — | 1091 | 132 | 6,650 |
| 41 | 522 | 18 | — | — | 1090 | 10 | 6,650 |

¹Essentially saturated.
²Includes water from stream 24 only. Does not include water vapor in combustion gas (stream 26).

Table II below shows the stream quantities (in pound moles per hour) in streams 22 and 24. Reference numeral refers to FIG. 1.

TABLE II

| Constituent | Streams | |
|---|---|---|
| | 22 | 24 |
| Ammonium Bisulfate | 890 | 251 |
| Ammonium Sulfate in Solution | | 270 |
| Ammonium Sulfate in Suspension | | 386 |
| Sulfur in Suspension | | 9 |
| Water | | 3,000 |

EXAMPLE 2

This example describes the second embodiment of the invention, with particular reference to FIG. 2 of the drawing. Except as otherwise shown in FIG. 2, the flow sheet in this embodiment is the same as in FIG. 1 although stream quantities are not necessarily the same. Flue gas containing about 0.2% by volume of $SO_2$ is shown here for purposes of illustration. Stream quantities in pound moles per hour (except in streams 22 and 24) are shown in Table III below. In Table III, reference numerals refer to FIG. 2 of the drawing where the indicated reference numeral is shown in FIG. 2, and to FIG. 1 otherwise. The stream quantity in line 29 does not include makeup ammonia added via line 33. Stream quantities in lines 22 and 24 are the same as in Example 1, and are given in Table II above.

TABLE III

| Reference Numeral | Constituent | | | | | | | |
|---|---|---|---|---|---|---|---|---|
| | $SO_2$ | $SO_3$ | NO | $NO_2$ | $NH_3$ | S | $H_2S$ | $H_2O$ |
| 10 | 468 | 2 | 96 | 10 | — | — | — | (1) |
| 13 | 1071 | 36 | — | — | 2181 | 142 | — | 13,300 |
| 15 | 54 | — | 12 | — | 70 | — | — | (1) |
| 16 | 1583 | 53 | — | — | 2111 | 29 | — | 13,300 |
| 19 | 497 | 17 | — | — | 673 | 9 | — | 4,240 |
| 20 | 1086 | 36 | — | — | 1438 | 20 | — | 9,060 |
| 23 | 497 | — | — | — | — | — | — | 1,240 |
| 26 | — | — | -2 | — | — | — | — | — |
| 29 | 26 | — | 2 | — | 673 | — | — | 3,000(2) |
| 33 | — | — | — | — | 70 | — | — | — |
| 34 | — | — | — | — | — | — | 81 | — |
| 35 | — | — | 2 | — | — | — | — | (1) |

(1)Essentially saturated.
(2)Includes water from stream 24 only. Does not include water vapor in combustion gas (stream 26)

What is claimed is:

1. A method of separating sulfur oxides and nitrogen oxides from a gas stream containing the same comprising the step of contacting said gas stream with an aqueous solution comprising ammonium sulfite and ammonium thiosulfate such that the molar flow rate of ammonium sulfite, AS is at least equal to the value determined from the equation:

$$AS = 0.9A + 2B + 0.006Z + c(1.8A + 2B + 2.0y + 0.024Z + D)$$

where
- A = molar flow rate of $SO_2$ in the influent flue gas stream;
- B = molar flow rate of $SO_3$ in the influent flue gas stream;
- c = is the molar ratio of ammonium sulfite to ammonium bisulfite desired in the effluent stream, generally between about 0.15 and 1.0;
- D = molar flow rate of ammonium bisulfite in the influent scrubber solution;
- Z = molar flow rate of oxygen in the influent flue gas stream; and
- y = $O_2$ equivalent to molar flow rate of $NO_x$ in the influent flue gas stream;

and the molar flow rate of ammonium thiosulfate, NT, is within the range determined with the following equation:

$$NT = X(1.0y + 0.012Z)$$

where
- X is a number between 1.1 and 2.0; and
- y and Z are as previously defined, said contacting being accomplished at conditions such that sulfur dioxide reacts with ammonium sulfite to form ammonium bisulfite and nitrogen oxides react with ammonium thiosulfate.

2. The method of claim 1 wherein the weight ratio of ammonium thiosulfate and ammonium sulfite in said aqueous solution is within the range from about 0.1 to about 0.7.

3. The method of claim 1 wherein spent aqueous solution is at least partially regenerated by:
   (a) acidifying at least a portion of said spent solution with ammonium bisulfate, thereby liberating $SO_2$ and forming ammonium sulfate;
   (b) thermally decomposing said ammonium sulfate, thereby forming ammonium bisulfate and ammonia; and
   (c) reacting said ammonia with at least one reagent selected from the group consisting of ammonium bisulfite and sulfur dioxide and with at least one reagent selected from the group consisting of hydrogen sulfide and sulfur in an aqueous medium.

4. The method of claim 1 wherein said contacting is accomplished at a temperature within the range from about 95° to about 140° F.

* * * * *